(No Model.) 4 Sheets—Sheet 1.

F. A. WALSH.
MACHINE FOR MAKING SHEET METAL VESSELS.

No. 408,774. Patented Aug. 13, 1889.

Witnesses:

Inventor:
Francis A. Walsh
By Stout & Underwood
Attorneys.

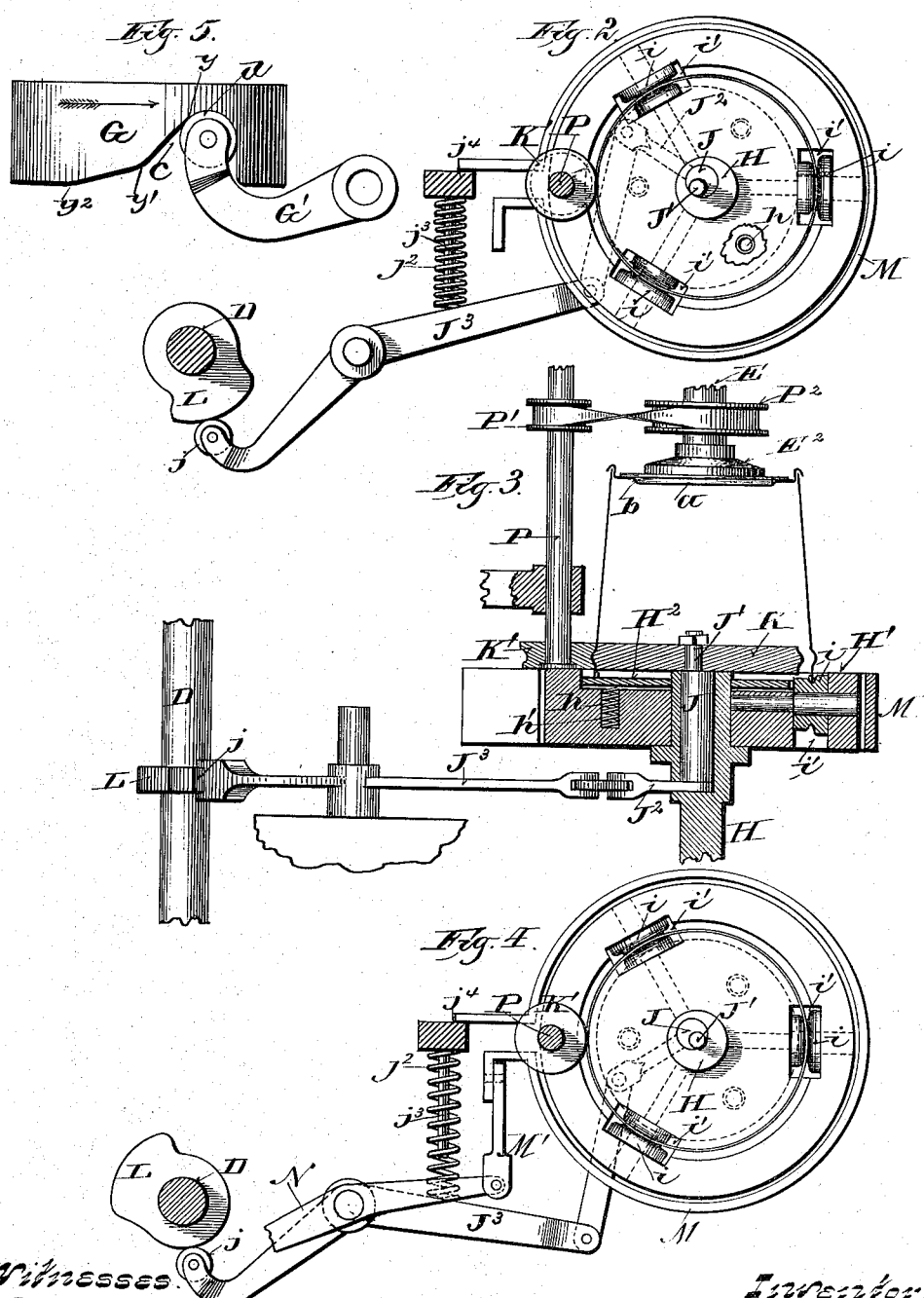

(No Model.) 4 Sheets—Sheet 3.
F. A. WALSH.
MACHINE FOR MAKING SHEET METAL VESSELS.

No. 408,774. Patented Aug. 13, 1889.

Witnesses:
E. G. Asmus
Maurice F. Frear

Inventor:
Francis A. Walsh
By Stout & Uhlenhand
Attorneys.

(No Model.) 4 Sheets—Sheet 4.

F. A. WALSH.
MACHINE FOR MAKING SHEET METAL VESSELS.

No. 408,774. Patented Aug. 13, 1889.

Witnesses:
E. G. Asmus
Maurice F. Frear

Inventor:
Francis A. Walsh
By Stout & Underwood
Attorneys.

UNITED STATES PATENT OFFICE.

FRANCIS A. WALSH, OF MILWAUKEE, WISCONSIN.

MACHINE FOR MAKING SHEET-METAL VESSELS.

SPECIFICATION forming part of Letters Patent No. 408,774, dated August 13, 1889.

Application filed February 8, 1887. Serial No. 226,922. (No model.)

*To all whom it may concern:*

Be it known that I, FRANCIS A. WALSH, of Milwaukee, in the county of Milwaukee, and in the State of Wisconsin, have invented certain new and useful Improvements in Machines for Making Sheet-Metal Vessels; and I do hereby declare that the following is a full, clear, and exact description thereof.

My invention relates to machines for making sheet-metal vessels, and has for its objects to simultaneously curl the rim, bead the body, and seam a cover-piece to said body of a vessel, or to perform any one or two of said operations.

To carry out the above-named objects my invention consists in certain peculiarities of construction and combination of parts, to be hereinafter described with reference to the accompanying drawings and subsequently claimed.

Figure 1:
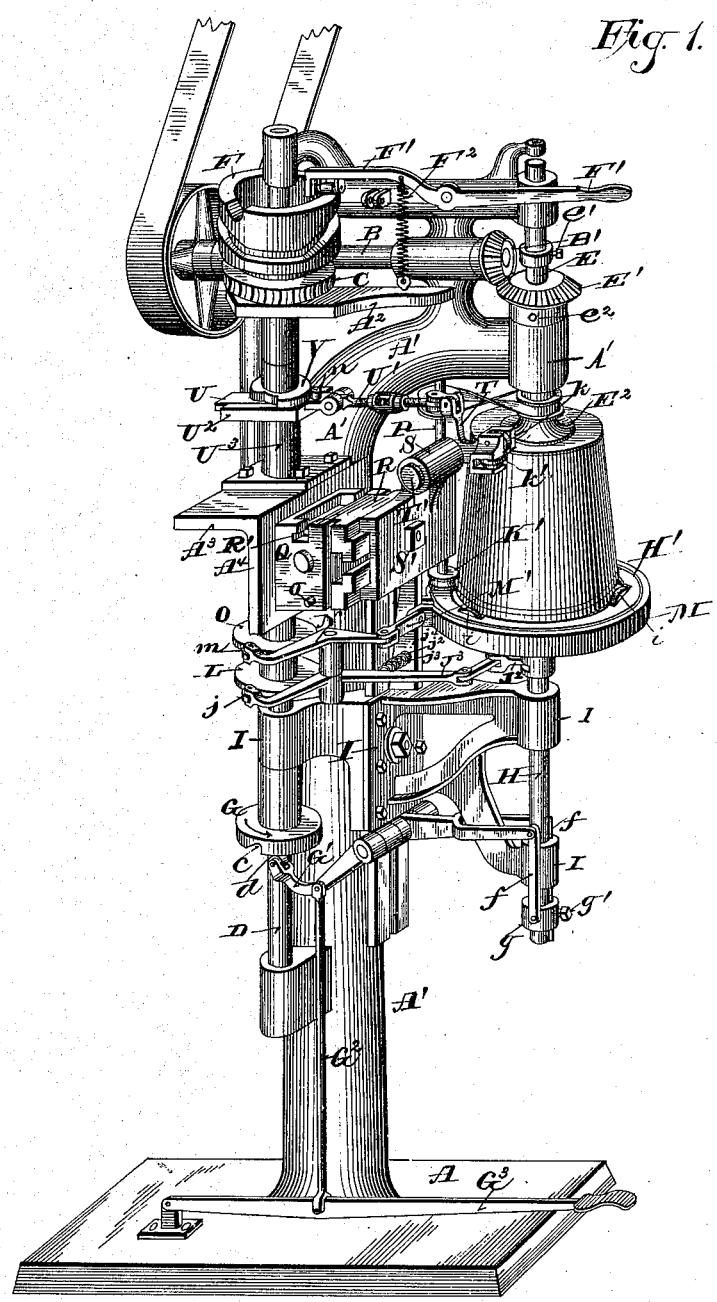
Figure 6:
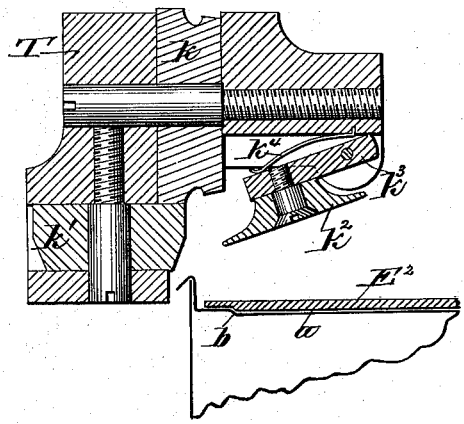
Figure 7:
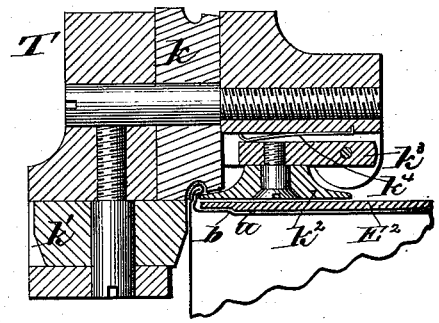

In the drawings, Figure 1 represents a perspective view of my machine; Figs. 2 and 4, sectional detail views illustrating the operation of the rolling and beading mechanism; Fig. 3, a detail vertical section illustrating a sheet-metal vessel being operated upon by my machine; Fig. 5, a detail view of the cam-wheel and lever for actuating the lower chuck or head; Figs. 6 and 7, detail views of the seaming-head shown in Fig. 1; Figs. 8, 9, 10, 11, 12, and 13, views in detail of different forms of heads provided with seaming-rolls of the same construction and relative arrangement as those shown in Figs. 6 and 7.

Referring by letter to the drawings, A represents the base; A', the main standard; B, the driving-shaft geared to a worm C, loose on a vertical shaft D and provided with a gear-wheel B' in mesh with a similar wheel E' on a vertical spindle E, the latter carrying a chuck $E^2$ on its lower end. Thus far the parts just described, with the exception of the chuck, correspond with similar parts set forth in my patent, No. 382,499, issued May 8, 1888. The chuck $E^2$ in the present instance is provided upon its working-face with an extension $a$, Fig. 3, to fit a countersink $b$ in the opposing cover-piece of the vessel, and this extension may be of any desirable width, according as the countersink may vary in different styles of cover-pieces, and of less diameter than said chuck, whereby a bearing-surface is left between the periphery of the latter and that of the former, said countersink $b$ being other than the one adjacent to the body of the vessel.

Instead of an extension, I may provide the chuck-face with a depression or groove to fit a raised portion of the cover-piece, it being obvious that one construction is the equivalent of the other. By having the chuck provided with an extension or depression to fit a corresponding countersink or bead on the cover-piece the vessel is accurately centered and held in place against the action of the seaming-head, and this construction enables me to make the chuck of less diameter than that of the countersink in the cover-piece adjacent to the body of the vessel to give room for the rolling in of the seam or to finish it against the edge of said chuck.

Fast on the vertical shaft D is a cam-wheel F, interiorly provided with a clutch mechanism, (not shown, but similar to that described and illustrated in my patent No. 321,263, dated June 30, 1885.) By a downward movement of the lever F', which is fulcrumed to an arm of the standard A', the clutch mechanism is operated to unite the cam-wheel F with the worm-wheel C, and this lever is returned to its normal position by a spring $F^2$, connecting it with a shelf $A^2$ on said standard. Like the machine described in the above-named patent, No. 382,499, the lower portion of the vertical shaft D is provided with a wheel G, having a cam-notch $c$ to engage a roulette $d$ on a lever G', fulcrumed to an adjustable bracket I, and connected by a rod $G^2$ with a foot-lever $G^3$, that is fulcrumed to the base A, and said rod may be made adjustable, as in said prior patent, No. 382,499. The outer end of the lever G' is bifurcated, as shown in Fig. 1, and connected by links $f$ to a collar $g$, feathered to a spindle H and held in its adjusted position by a set-screw $g'$. The spindle H is in line with the spindle E and has its bearings in the arms of the bracket I, and the upper end of this spindle H carries a head H', that takes the place of the lower chuck described in the prior patent, No. 382,499, above referred to, and is suitably recessed to receive the plate $H^2$, Fig. 3, that rests on springs $h$, for which seats $h'$ are bored in said head. The spring-plate $H^2$ serves to support that portion of the vessel-rim that is not in contact with the grooved roll $i$; but when working heavy stock said plate may be omitted.

Journaled in the head H' are a series of grooved rolls $i$, that project up through suitable openings $i'$ in the spring-plate H², and the spindle H has a bore in the upper end to receive a journal J, arranged eccentrically to the vertical axis of said spindle, and provided with an extension or wrist-pin J' at one side of its center, on which is attached a beading-roll K, as best illustrated in Fig. 3. An arm J² of the journal J extends through a suitable slot in the spindle H, and is toggled to a bell-crank J³, that is fulcrumed to the rear portion of bracket I, and is provided at its outer end with a roulette $j$, that is held in impingement against a cam-wheel L on the shaft D by means of a spring $j^2$, arranged on a pin $j^3$, projecting from a plate $j^4$, that preferably forms part of said bracket I.

Surrounding the head H' is a friction-brake M, one end of which is secured to the plate $j^4$ and its other end provided with a pivoted link M', toggled to a bell-crank N, that is fulcrumed to the bracket I and provided at its free end with a roulette $m$, that impinges against a cam-wheel O on the shaft D, the last-named bell-crank and cam-wheel being arranged just above like parts that serve to operate the beading-roll K. A vertical shaft P carries a beading-roll K' in opposition to the one K, and these beading-rolls may be multiplied when it is desirable to give the vessels more than one bead. The shaft P also carries a pulley P', that is belted to another pulley P² on the spindle E, this construction serving to compensate for any undue friction of the parts and insure the rotation of the roll K' in case said roll is tight on its shaft; but I have shown said roll as loosely mounted, and, if desired, the belt-and-pulley mechanism may be omitted.

A shelf A³ on the standard has a vertically-depending portion A⁴, to which latter is cast or otherwise secured a box Q, in which is fulcrumed a block R, having removably secured thereto and laterally adjustable thereon a depending flange S' of a bearing S for the journal T" of a lever, head, or bell-crank T, one arm of which latter carries rolls or formers $k$ $k'$, for making the seam described and claimed in my patent, No. 359,826, issued March 27, 1887, this seam consisting of flanges on the cover of the vessel spanning the rim of the body, the three thicknesses of metal being bent at an angle, leaving the outer edge of the cover projecting over and clasping the curve of the adjacent rim of the body, whereby the necessity of the soldering is avoided. The other arm of said bell-crank is toggled to an adjustable rod U', that connects with a sliding plate U, that fits in a guide-piece U², having a depending sleeve U³ surrounding the shaft D.

The sliding plate U is provided with a lug or roulette $n$, that comes in the path of a cam V on the shaft D, and this arrangement of parts serves to communicate the power from shaft D to operate the bell-crank T at proper intervals to bring the seaming-rolls into and out of action with relation to the vessel. The bell-crank T also carries a supporting-wheel $k^2$, (best illustrated in Figs. 6 and 7,) journaled to a pivoted arm $k^3$, that comes against a spring $k^4$, and while the seaming-rolls $k$ $k'$ are shown at right angles to each other they may be otherwise disposed to suit the character of the work, and I may also mount the roll $k^2$ on an eccentric shaft similar to the one J shown in Fig. 3.

The box Q, block R, and sliding plate U are similar in construction and arrangement to like parts in my patent, No. 382,499; but the rack, its pinion, and connections for operating the latter parts have been omitted in this instance, for the reason that in making the peculiar seam above referred to no rocking motion is necessary, and to hold the block R in its fixed position I use a pin $o$, (shown in Fig. 1,) that passes through a suitable aperture in the box Q to enter a corresponding aperture in said block.

At any time when it is desirable to double-seam the cover-pieces to the vessel-bodies I may employ the head shown and described in my said patent, No. 382,499, place a rack in the guides R' of the box Q, and make the proper connections with the cam-wheel F and sliding plate U.

Although I have not shown a rearwardly-projecting arm as belonging to the block R and a cam-wheel on the shaft D to operate said arm, it will be understood that when using the double-seaming head above referred to said arm and cam-wheel are necessary.

Figure 8:
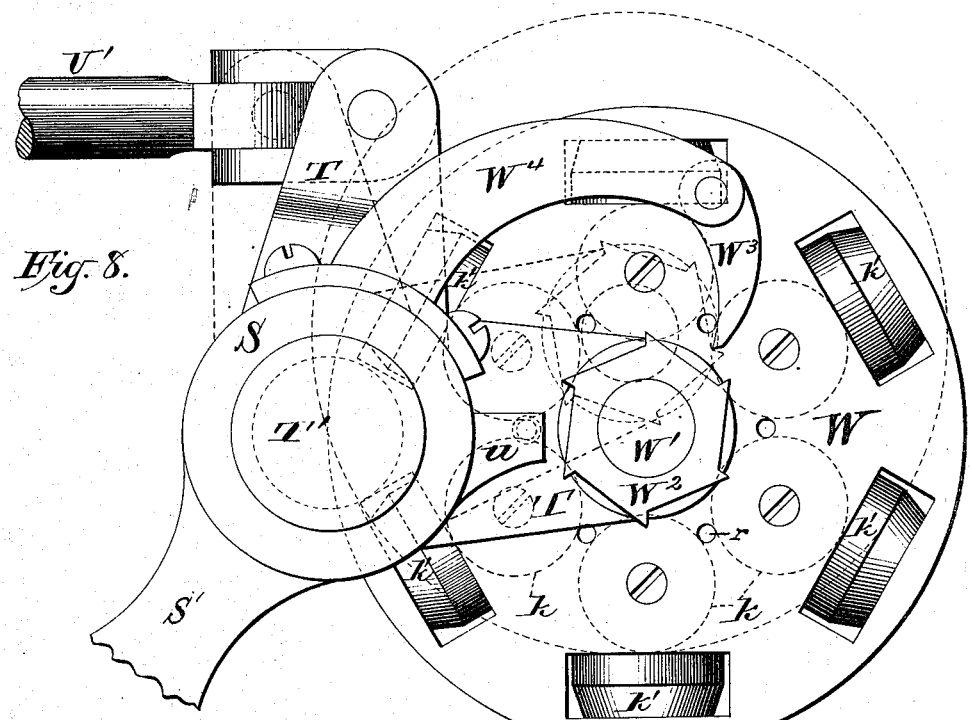

In Fig. 8 I show a head comprising a disk W, provided with a series of the seaming-rolls $k$ $k'$, arranged in successive pairs, as shown by full and dotted lines, said rolls being similar in construction and relative action as similar parts shown in Figs. 1, 6, and 7. The disk W is loosely journaled on the stud W', projecting from the outer arm of the bell-crank T, and it may be arranged in either a vertical or horizontal plane, as found most desirable.

I provide the outer face of the disk W with a ratchet W², that comes in contact with a pawl W³, pivoted to an arm W⁴, that is rigidly connected to the bearing S of the bell-crank, and by this arrangement of parts I partially rotate said head each time the same is tilted or drawn away from the vessel by the movement of the cam-actuated sliding plate U, having the rod-connection U' with said bell-crank.

The means just described are the ones preferably employed for causing a partial rotation of the disk W; but it is obvious that other suitable means may be used for the same purpose.

By the employment of a head such as I have just described the wear is equally distributed on a series of seaming-rolls arranged in successive pairs, and in some instances, where it may be found desirable to make the seam tighter than can be done with one pair of rolls, the groove in the roll $k$ of the next succeeding pair may be adapted for such tightening of the seam and the cam V provided with a contour that will serve to tilt the head at predetermined intervals, whereby the latter set of rolls will be brought into action at the proper time.

Figure 13:
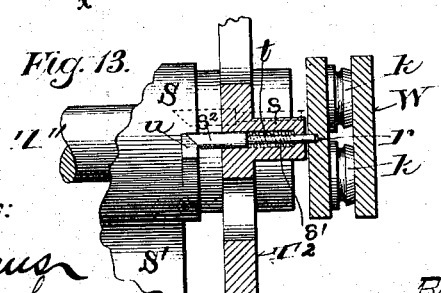

In order to prevent any possible rotation of the disk W when the rolls $k$ $k'$ come in contact with the vessel, I may employ any suitable stop mechanism, and in Fig. 13 (a section taken on line $x$ $x$, Fig. 11) I have shown one form of such mechanism, that consists in providing said disk with a series of depressions similar to the one $r$ and corresponding in number with the teeth in the ratchet $W^2$ and the bell-crank T, with a hollow projection $s$, in which latter I loosely arrange a pin that has a reduced portion $s'$, surrounded by a spiral spring $t$, the larger portion $s^2$ of said pin being beveled at its end to come in contact with a corresponding lug $u$ on the bearing $s$ for the journal of said bell-crank when the latter is tilted toward the vessel. When the pin and lug come in contact, the former is pushed in against the spring $t$ to engage the first one of the depressions $r$ that comes in its path to thereby lock the disk W. When the seaming-head is tilted back away from the vessel, the locking-pin carried therewith away from the lug $u$, and the expanding force of the spring $t$ forces said pin out of engagement with the disk that carries the seaming-rolls.

Figure 11:
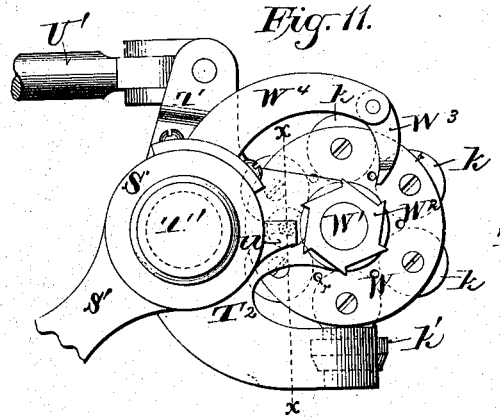
Figure 12:
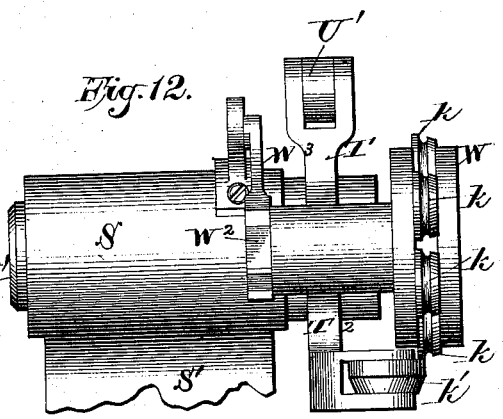

In Figs. 11 and 12 I show a variation of the circular head shown in Fig. 8 and heretofore described. This variation consists in omitting all but one of the rolls marked $k'$, the latter being principally employed for bending down the flange of a cover-piece against the body of a vessel. The roll $k'$ in the latter form of head is journaled in an arm $T^2$, that forms part of the bell-crank, and the several rolls $k$ are successively brought into operative relation with the one first named by the intermittent partial rotation of the disk W, actuated as above described. In both styles of the seaming-heads shown by Figs. 8, 11, and 12 it will be understood that I may provide the disk W with supporting-wheels $k^2$, similar to the one described in connection with Figs. 6 and 7, and both these heads may be brought in and out of contact with the vessel by a hand-lever instead of being automatically actuated, as above described.

Figure 9:
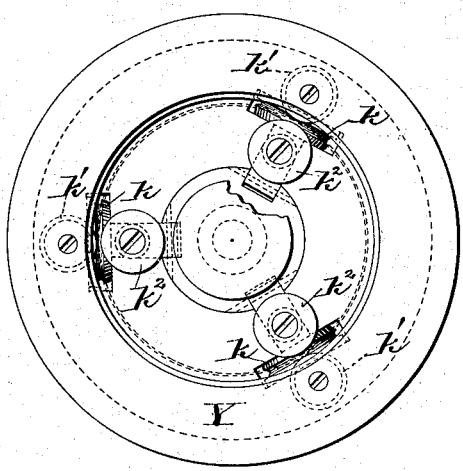
Figure 10:
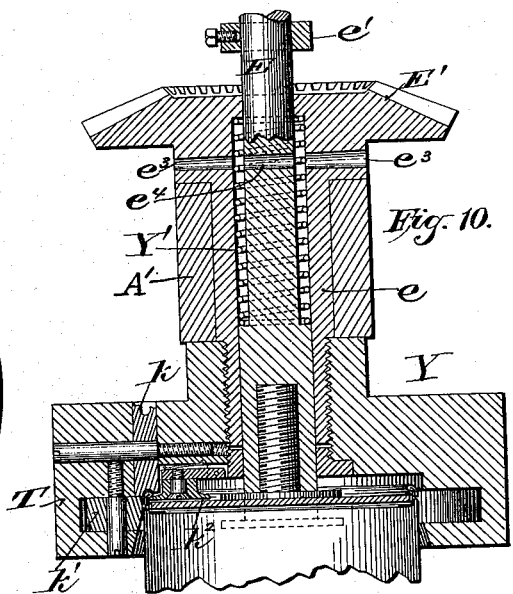

In Figs. 9 and 10 I show my seaming-rolls $k$ $k'$ and pivoted supporting-wheels $k^2$ as applied to a revolving head to operate upon a non-revolving vessel. In this instance I screw-thread or otherwise rigidly secure a circular part Y to the extended hub $e$ of the gear E', and in this circular part I arrange one or more pairs of the seaming-rolls $k$ $k'$ and corresponding supporting-wheels $k^2$, said arrangement of these latter parts being precisely similar to that shown in detail, Figs. 6 and 7.

A spring Y' is arranged in the bore of the gear-hub $e$ to encircle the spindle E and exert its pressure thereon in a direction toward the vessel to be operated upon, the movement of said spindle being limited by means of a collar $e'$, adjustably secured thereon.

At any time it may be desirable to rotate the vessel without operating on it by the rolls of the last-described form of head I pass a pin $e^2$ (shown in Fig. 1) through suitable openings $e^3$ $e^4$ (see Fig. 10) in the spindle E and hub of the gear E', respectively. When the parts are thus connected, the machine may be used for either curling the rim, beading the body, or successively performing both these operations on vessels to which a cover-piece may have been previously attached.

If found desirable, the seaming-rolls $k$ $k'$ of the seaming-head may be removed and the places of the ones $k$ supplied by the grooved curling-rolls $i$ of the lower head.

Either form of head shown in Figs. 1, 6, 7, 8, 11, and 12 may be used for seaming cover-pieces to filled vessels; but for this class of work I prefer to use the head described in connection with Figs. 9 and 10, in order that said head may be rotated around the vessel to thereby prevent the contents of the latter from being splashed.

In the operation of my invention, where it is desired to curl the rim, bead the body, and seam a cover-piece thereon during one rotation of the shaft D, said vessel is placed mouth downward on the lower head H' and the starting-lever F' depressed. This depression of the lever starts the shaft D. The rotation of said shaft causes the cam-wheel G, fast thereon, to rotate in the direction of the arrow, Figs. 1 and 5. By this means the roulette $d$ is gradually disengaged from the notch $c$ in said wheel and the lever G' actuated to chuck the vessel while said wheel travels from $y$ to $y'$.

While the cam-wheel G is traveling the distance from $y'$ to $y^2$, Fig. 5, the rotation of the vessel against the grooved rolls $i$ in the lower head H' will cause the rim of said vessel to be rolled in or curled, the lever N being actuated by the cam O on the shaft D to set the friction-brake M to hold the lower head H' stationary while this rolling or curling is being accomplished. By the time this operation is completed the cam-wheel O on the shaft D will again actuate the lever N to release the friction-brake M, and thereby allow the rotation of the lower head. The bell-crank T has in the meantime been tilted by the action of the cam-wheel V on the shaft D to bring the seaming-rolls $k$ $k'$ into operative position against the cover-piece, which latter in this case is the bottom of the vessel.

The beveled portion of the roll $k'$ serves to flatten the flange of the cover-piece down against the vessel-body, (and for some purposes this will be a sufficient seam, and if it is desirable, the roll $k$ may be omitted,) and the plain portion of said roll acts as a support when the vessel has been forced up to bring the three thicknesses of metal (formed by the union of said cover-piece and vessel-body) in contact with the groove in the roll $k$. The pressure caused by the tilting of the rolls $k$ $k'$ against the upward movement of the vessel (or by the tilting alone) turns the united cover-piece and wall of the vessel-body inward, as shown by Fig. 7, the wheel $k^2$ at the same time being brought to the position illustrated in the same figure to support the seam thus turned in.

The seam formed as above described may be either a slight bend, right-angular bend, a curl, or a roll, according to the groove in the roll $k$, said seam varying on different styles of vessels. The lever $J^3$ is now actuated by the cam L on the shaft D to bring the roll or rolls K into contact with the vessel-body and into direct opposition to the roll K' on the shaft P, whereby one or more beads are formed on said vessel's body. When the shaft D completes its revolution, the roulette $n$ on the sliding plate U comes into the notch of the cam-wheel V to tilt back the bell-crank T, and the roulette $d$ on the lever G' engages the notch $c$ in the cam-wheel G to unchuck the vessel.

It will be noticed that when the seaming-head described in connection with Figs. 9 and 10 is employed to rotate around the vessel the spring chuck or plate is always in advance of said head, as shown by dotted lines, Fig. 10, and by this means the cover-piece is held down upon the vessel-body against the action of the rolls $k'$ and prevented from being displaced by the same when first coming into frictional contact therewith.

The head H' may be secured to the driving parts and the friction-brake M omitted, the vessel being held by the operator during the time required for rolling in or curling the rim, and when this operation is completed and said vessel released the latter will be ordinarily rotated by its frictional contact with said head.

The seaming mechanism can be brought into play either automatically or by hand; or in some instances this seaming mechanism may also be omitted and the machine used entirely for curling the rim and beading the body of the vessel.

It will be also understood that the vessels worked upon by my machine may be chucked and rotated independent of the curling, beading, or seaming mechanism above described, this operation being accomplished by depressing and holding down the foot-treadle $G^3$, it being impossible to start any one or all of said mechanisms until the lever F' is actuated. When the treadle $G^3$ is actuated as described above, the head H' may be held against rotation for a certain time, and the upward movement of said head against the rotation of the vessel will cause the rolls $i$ to perform the curling operation.

The head or lever carrying the seaming-rolls may be held in a fixed position, or, in other words, the tilting mechanism may be disconnected therefrom. In this case, or for doing either one of the latter operations, the vessel is forced up by the movement of the lower chuck to come against the seaming-rolls, the chuck on the live-spindle being, as before stated, in advance of said rolls to prevent displacement of the cover-piece.

I do not wish to be understood as broadly claiming seaming and flattening rolls arranged in a head at an angle to each other, as I limit myself to a combination capable of effecting the seam claimed in my patent, No. 359,826, as above recited.

Having thus fully described my invention, what I claim as new, and desire to secure by Letters Patent, is—

1. In a machine for making sheet-metal vessels, a revoluble chuck or head having a series of grooved rolls mounted therein, in combination with means, substantially as described, for stopping the rotation of said chuck or head at a certain time and for a predetermined interval, and then permitting it to again revolve, as and for the purpose set forth.

2. In a machine for making sheet-metal vessels, a chuck or head having a series of grooved rolls mounted therein, in combination with a yielding bearing arranged within the head and provided with a series of openings corresponding with the rolls, as and for the purpose set forth.

3. In a machine for making sheet-metal vessels, the combination of a chuck or head having a series of grooved rolls mounted therein, a loose bearing arranged within the head and provided with a series of openings corresponding with the rolls, and a suitable spring or springs arranged to exert their force on said bearing, as and for the purpose set forth.

4. In a machine for making sheet-metal vessels, the combination of a head or chuck having a series of grooved rolls mounted therein and provided with a series of seats, springs arranged in the seats, and a loose plate that rests upon the springs and has a series of openings corresponding with the rolls, as and for the purpose set forth.

5. In a machine for making sheet-metal vessels, the combination, with a suitable chucking mechanism, of a beading-roll arranged to come inside a chucked vessel, a beading-surface arranged upon the outside of said vessel to oppose the said roll, and suitable mechanism for bringing the inside roll in and out of contact with the vessel while the latter is being revolved, substantially as set forth.

6. In a machine for making sheet-metal vessels, the combination of a revoluble chuck or head, a beading-roll having its journal eccentrically arranged in the spindle of said chuck or head and provided with a suitable arm, and a beading-surface in opposition to said roll, as set forth.

7. In a machine for making sheet-metal vessels, the combination of a revoluble chuck or head, a beading-roll having its journal eccentrically arranged in the spindle of said chuck or head, a beading-surface in opposition to the roll, and means, substantially as described, for automatically bringing said beading-roll in and out of contact with the body of the vessel being operated upon by the machine, as and for the purpose set forth.

8. In a machine for making sheet-metal vessels, the combination of a revoluble chuck or head having grooved rolls mounted therein, a beading-roll having its journal eccentrically arranged in the spindle of the chuck or head, a beading-surface in opposition to the roll, a brake for said chuck or head, and means, substantially as described, to automatically operate the brake and bring said beading-roll in and out of contact with the body of a vessel being operated upon by the machine at predetermined intervals, as and for the purpose set forth.

9. In a machine for making sheet-metal vessels, the combination of a revoluble chuck or head, a beading-roll eccentrically journaled to the spindle of said chuck or head, a shaft carrying a beading-roll in opposition to the one first named and provided with a pulley geared to a suitably-arranged driving-pulley, and suitable mechanism for bringing the first-named roll in and out of contact with the body of the vessel being operated upon, as and for the purpose set forth.

10. In a machine for making sheet-metal vessels, the combination of a head, seaming-rolls journaled therein and arranged in pairs, of which the flattening-rolls are arranged at an angle to the bending-rolls, and means, substantially as described, for actuating said head with relation to a vessel on the machine, whereby the flange of a cover spanning the rim of the vessel-body is laid close against the latter, and the three thicknesses of metal thus united are bent at an angle, leaving the outer edge of the cover projecting over and clasping the curve of said rim, as and for the purpose set forth.

11. In a machine for making sheet-metal vessels, the combination of a head, seaming-rolls journaled therein and arranged in pairs, of which the flattening-rolls are at an angle to the bending-rolls, means, substantially as described, for actuating said head with relation to a vessel on the machine, whereby the flanges of a cover spanning the rim of the vessel-body are laid close against the latter, and the three thicknesses of metal thus united bent at an angle, leaving the outer edge of the cover projecting over and clasping the curve of said rim, and supporting-wheels for the turned stock, as and for the purpose set forth.

12. In a machine for making sheet-metal vessels, the combination of a head, seaming-rolls journaled therein and arranged in pairs, of which the flattening-rolls are beveled and at an angle to the bending-rolls, and means, substantially as described, for actuating said head with relation to a vessel on the machine, whereby the flanges of a cover spanning the rim of the vessel-body are laid close against the latter, and the three thicknesses of metal thus united bent at an angle, leaving the outer edge of the cover projecting over and clasping the curve of said rim, as and for the purpose set forth.

13. In a machine for making sheet-metal vessels, the combination of a head having seaming-rolls operatively connected thereto, a supporting-wheel for the seam, arranged on a pivoted arm, and a spring arranged to exert its force against said arm, as and for the purpose set forth.

14. In a machine for making sheet-metal vessels, the combination of a bell-crank lever, a loosely-journaled disk having seaming-rolls mounted therein, and means, substantially as described, for tilting said lever and for partially rotating the disk at predetermined intervals, as and for the purpose set forth.

15. In a machine for making sheet-metal vessels, the combination of a bell-crank lever, a loosely-journaled disk having seaming-rolls mounted therein, and means, substantially as described, for tilting said lever and partially rotating the disk at predetermined intervals, and a locking mechanism for holding the disk stationary when the seaming-rolls are in contact with a vessel being operated upon by the machine, as and for the purpose set forth.

16. In a machine for making sheet-metal vessels, the combination of a bell-crank lever carrying a loosely-journaled disk having seaming-rolls mounted therein, supporting-wheels arranged adjacent to the rolls, and means, substantially as described, for tilting said lever and partially rotating said disk at predetermined intervals, as and for the purpose set forth.

17. In a machine for making sheet-metal vessels, the combination of a chucking mechanism, a curling mechanism, a seaming mechanism, and a revoluble shaft provided with a series of cams arranged at intervals thereon to automatically impart a successive action to the several mechanisms, as and for the purpose set forth.

18. In a machine for making sheet-metal vessels, the combination of a chucking mechanism, a beading mechanism, a seaming mechanism, and a revoluble shaft provided with a series of cams arranged at intervals thereon to automatically impart a successive action to the several mechanisms, as and for the purpose set forth.

19. In a machine for making sheet-metal vessels, the combination of a chucking mechanism, a curling mechanism, a beading mechanism, a seaming mechanism, and a revoluble shaft provided with a series of cams arranged at intervals thereon to automatically impart a successive action to the several mechanisms, as and for the purpose set forth.

20. In a machine for making sheet-metal vessels, the combination of the chucks, curling-rolls carried by one of the chucks, a beading-roll arranged to come inside a chucked vessel, a beading-surface arranged to oppose the beading-roll, and suitable mechanism for actuating the chucks and for bringing said beading-roll in and out of contact with the chucked vessel, substantially as and for the purpose set forth.

21. In a machine for making sheet-metal vessels, the combination, with the chucks, of a roll carried by one of the chucks and suitable mechanism for bringing the roll in and out of contact with a chucked vessel from within the circumference thereof, substantially as set forth.

In testimony that I claim the foregoing I have hereunto set my hand, at Milwaukee, in the county of Milwaukee and State of Wisconsin, in the presence of two witnesses.

FRANCIS A. WALSH.

Witnesses:
H. G. UNDERWOOD,
N. E. OLIPHANT.